(12) United States Patent
Wellborn et al.

(10) Patent No.: US 11,815,142 B2
(45) Date of Patent: Nov. 14, 2023

(54) MAGNETORHEOLOGICAL BRAKE WITH HIGH TORQUE AND FAST RESPONSE

(71) Applicant: Vanderbilt University, Nashville, TN (US)

(72) Inventors: Patrick Wellborn, Nashville, TN (US); Jason Mitchell, Nashville, TN (US); Robert Webster, III, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 22 days.

(21) Appl. No.: 17/428,052

(22) PCT Filed: Feb. 3, 2020

(86) PCT No.: PCT/US2020/016333
§ 371 (c)(1),
(2) Date: Aug. 3, 2021

(87) PCT Pub. No.: WO2020/163203
PCT Pub. Date: Aug. 13, 2020

(65) Prior Publication Data
US 2022/0128106 A1    Apr. 28, 2022

Related U.S. Application Data

(60) Provisional application No. 62/800,622, filed on Feb. 4, 2019.

(51) Int. Cl.
*F16D 57/00* (2006.01)
*F16D 121/20* (2012.01)
*F16D 131/00* (2012.01)

(52) U.S. Cl.
CPC ........ *F16D 57/002* (2013.01); *F16D 2121/20* (2013.01); *F16D 2131/00* (2013.01)

(58) Field of Classification Search
CPC . F16D 57/002; F16D 2121/20; F16D 2131/00
(Continued)

(56) References Cited

U.S. PATENT DOCUMENTS 5,598,908 A    2/1997   York
5,988,336 A *  11/1999  Wendt ..................... F16D 37/02
                                                          192/58.4

(Continued)

FOREIGN PATENT DOCUMENTS

CN    109027056 A  *  12/2018

OTHER PUBLICATIONS

International Search Report and Written Opinion dated Apr. 29, 2020 for corresponding International Application No. PCT/US2020/016333.

*Primary Examiner* — Melanie Torres Williams
(74) *Attorney, Agent, or Firm* — TAROLLI, SUNDHEIM, COVELL & TUMMINO L.L.P.

(57) ABSTRACT

This disclosure relates to a magnetorheological (MR) brake. The MR brake includes a rotor constructed at least partially of a ferromagnetic material, and a housing that supports the rotor such that the rotor and the housing are rotatable relative to each other about an axis, wherein the housing and rotor are configured such that a fluid gap is defined between the housing and the rotor, and wherein portions of the housing adjacent the rotor are constructed at least partially of a ferromagnetic material. An MR fluid is disposed in the fluid gap. A current-carrying coil is excitable to generate a magnetic field within ferromagnetic portions of the rotor and the housing and acts on the MR fluid. At least one element constructed of a material having low magnetic permeability is configured route the lines of magnetic flux through surrounding higher permeability material on opposite sides of the fluid gap.

20 Claims, 7 Drawing Sheets

(58) Field of Classification Search
USPC .................................................. 188/267.2
See application file for complete search history.

(56) References Cited

U.S. PATENT DOCUMENTS

| | | | |
|---|---|---|---|
| 8,215,467 B2* | 7/2012 | Smith | ............... F16D 37/02 |
| | | | 188/267.2 |
| 2003/0079948 A1 | 5/2003 | Jolly | |
| 2011/0114421 A1 | 5/2011 | Piech | |
| 2013/0175132 A1 | 7/2013 | Battlogg | |
| 2015/0136548 A1 | 5/2015 | Shimura | |
| 2015/0144442 A1* | 5/2015 | Shimura | ............ F16D 63/002 |
| | | | 188/267.2 |
| 2016/0290421 A1 | 10/2016 | Jeong | |

* cited by examiner

MAGNETORHEOLOGICAL BRAKE WITH HIGH TORQUE AND FAST RESPONSE

GOVERNMENT FUNDING

This invention was made with government support under Grant No. DC012593, awarded by the National Institutes of Health and under Grant No. 144519 awarded by the National Science Foundation. The Government has certain rights in the invention.

BACKGROUND

Brakes are commonly used in a range of fields, from automobiles and industrial equipment to haptics and robotics, to dissipate kinetic energy. There are a variety of brake types to choose from and the ultimate choice depends on the application. In some applications, such as haptic and miniature robotic systems, it is desirable for a brake to be small, lightweight, has a fast response time, and has high braking torque.

In order to develop a brake that meets these criteria, it is important to fully understand the different types of brakes along with their advantages and disadvantages. The most common brake, which is used almost ubiquitously in automobiles, is the friction brake. Whether actuated by hydraulic fluid or by an electromechanical element (or a combination of the two, i.e., electro-hydraulic), the basis of this brake is utilizing a friction surface to press into the rotor and dissipate the kinetic energy. While this type of brake is well-suited for many industrial and automotive applications due to its high braking torque, it has a slow response time. Conventional hydraulic brakes typically have a delay of 200-300 ms between when the brake pedal is pressed and when a braking response is observed at the wheels. In addition to the slow response time, friction brakes are disadvantaged by stiction, vibration, non-linearity between input current and output torque, and drift in output torque due to abrasion.

For certain applications, such as haptics or robotics, fast response times are paramount. Most electromagnetic brakes, which are brakes that utilize the electromagnetic force to create friction, can be actuated much faster than mechanical friction brakes (response times are on the order of 7-20 ms). Examples of electromagnetic brakes include electromechanical (EM) disk brakes, hysteresis powered (HP) brakes, magnetic particle (MP) brakes, and magnetorheological (MR) brakes. Even though EM disk brakes operate via an electric actuation, they transmit torque mechanically, which means there is a delay in response time for the moving components, e.g., the armature and rotor, to make contact. This delay is not present in the other types of electromagnetic brakes (i.e., a hysteresis brake, MP brake, or MR brake). If fast response time was the only desirable design parameter, then a piezoelectric brake would be optimal, since it is capable of a rise time of 2.6 ms, which is 5 and 6 times faster than MP and EM brakes, respectively. Unfortunately, while the piezoelectric brake is extremely fast, it lacks in braking torque output and is relatively large when compared to other miniature brakes both in literature and in commercially available products.

Hysteresis powered (HP) brakes are advantageous due to their smooth rotation as well as smooth, linear relationship between voltage (current) and output torque, both of which are inherent to the mechanical design of the brake. A drag cup, which is attached to the rotor, floats within a small air gap that passes through the magnetic field produced by the current-carrying coils within the brake. The magnetic flux on the drag cup creates a magnetic drag force via induced currents and Lenz's law, and this ultimately retards the spin of the rotor with braking torque. Since no surface of the rotor actually comes into contact with any part of the brake when it is energized, there is no stiction like EM brakes, and they are both repeatable and long lasting. An HP brake is well-suited for applications involving tension control (i.e., armature and coil winding, printing and labeling, braiding, sheeting, weaving, etc.), since the braking torque can be precisely controlled and is inherently smooth. However, HP brakes lack powerful braking torque and most commercially available models are large, resulting in a low torque to volume ratio.

With a magnetic particle (MP) brake, the rotor never comes into contact with the outer housing to produce braking torque as it does with conventional EM brakes. Rather, a gap between the rotor and the housing, which surrounds the rotor on all sides, is filled with fine, dry magnetic particles. Initially free flowing, the powder particles form chains after a magnetic field is produced by the current-carrying coil. These chains, which form along the magnetic flux lines, link the disk to the body, producing a braking torque. Just as with an HP brake, MP brakes are highly controllable and produce a current to torque curve that is smooth and linear. Conversely, MP brakes can produce a higher braking torque than HP brakes, but still have a relatively low torque to volume ratio. MP brakes also have a constant drag associated with them, as there is friction between the particles and the rotor even when the coil is not energized.

Similar to how MP brakes work, magnetorheological (MR) brakes include a gap between the rotor and the housing but, instead of dry magnetic particles, the gap is filled with a fluid containing micron-sized magnetically polarizable particles dispersed throughout the medium. Particle chains form when a magnetic field is applied, which increases the viscosity of the fluid and produces a braking torque to stop rotation of the rotor. MR brakes have all the advantages of the MP brake (i.e., highly controllable torque, smooth and linear current to torque curve, fast response, etc.), but are able to produce even higher braking torques and have less drag due to the MR fluid when the coil is not energized.

Of all the brakes listed above, MR brakes have the greatest potential to be scaled down for haptic and miniature robotic implementations, while remaining capable of producing a high braking torque. In addition, MR brakes have a fast response time, are highly controllable, are inherently stable, and are simple to interface between the mechanical and electrical systems. MR brakes therefore possess the best opportunity for achieving a high torque to volume ratio with fast response time.

MR devices, due to their many advantages, have been implemented in several applications including vibration control in civil engineering, haptics, exercise equipment, automotive suspension and braking, prosthetics, medical devices, and tactile displays. For example, in addition to MR brakes, there exists a number of other MR devices, including servo-valves, dampers, and shock absorbers, all of which utilize valve mode operation of MR fluids. In a braking/clutch implementation, the MR devices operate in shear mode.

SUMMARY

A miniaturized magnetorheological (MR) brake has a high braking torque to weight ratio. The MR brake utilizes a serpentine pattern of lines of magnetic flux that crosses all MR fluid shear surfaces multiple times, and is thereby able to maximize braking torque in a small form factor. The MR brake components have dimensions that are optimized so as to maximize magnetic flux density within the MR fluid gap. This maximizes the shear force of the MR fluid and ultimately increases the braking torque. Improved brake performance is characterized by the relationship between current and braking torque and the response time of the brake.

According to one aspect, a magnetorheological (MR) brake includes a rotor constructed at least partially of a ferromagnetic material and a housing that supports the rotor such that the rotor and the housing are rotatable relative to each other about an axis. The housing and rotor are configured such that a fluid gap is defined between the housing and the rotor. Portions of the housing adjacent the rotor are constructed at least partially of a ferromagnetic material. A magnetorheological (MR) fluid is disposed in the fluid gap. A current-carrying coil is excitable to generate a magnetic field that is concentrated in the ferromagnetic portions of the rotor and the housing and acts on the MR fluid. The MR brake also includes at least one element constructed of a material having low magnetic permeability configured to route the lines of magnetic flux through surrounding higher permeability material on opposite sides of the fluid gap to route the lines of magnetic flux to transition across the fluid gap multiple times and act on the MR fluid disposed in the fluid gap.

According to another aspect, the fluid gap can be defined between the housing and an upper surface of the rotor, between the housing and a lower surface of the rotor, and between the housing and an annular edge surface of the rotor.

According to another aspect, alone or in combinations with any other aspect, the at least one element constructed of a material having low magnetic permeability can be configured to cause the magnetic flux to transition across the gap adjacent the upper surface of the rotor, the lower surface of the rotor, and the edge surface of the rotor.

According to another aspect, alone or in combinations with any other aspect, the material having low magnetic permeability can be aluminum.

According to another aspect, alone or in combinations with any other aspect, the at least one element constructed of a material having low magnetic permeability can be ring-shaped and embedded in the rotor.

According to another aspect, alone or in combinations with any other aspect, the at least one element constructed of a material having low magnetic permeability can be a ring embedded flush with the upper surface of the rotor, a ring embedded flush with the lower surface of the rotor, and a ring embedded flush with the edge surface of the rotor.

According to another aspect, alone or in combinations with any other aspect, the current-carrying coil can be housed in the rotor. The rotor can be configured in use to be mounted stationary, the housing being rotatable relative to the rotor about the axis.

According to another aspect, alone or in combinations with any other aspect, the rotor can include a ferromagnetic disk and a shaft for supporting the rotor in the housing, and the current-carrying coil can be toroidal and housed in the disk.

According to another aspect, alone or in combinations with any other aspect, each of the element(s) constructed of a material having low magnetic permeability can be a ring-shaped element that is embedded in the disk and extends from a surface of the disk to adjacent the current-carrying coil. Each ring-shaped element can be configured to extend along the surface of the current-carrying coil.

According to another aspect, alone or in combinations with any other aspect, the at least one element constructed of a material having low magnetic permeability can include: a first ring-shaped element that is embedded in the disk and extends from an upper surface of the disk to adjacent the current-carrying coil; a second ring-shaped element that is embedded in the disk and extends from a lower surface of the disk to adjacent the coil; and a third ring-shaped element that is embedded in the disk and extends from an outer edge surface of the disk to adjacent the coil.

According to another aspect, alone or in combinations with any other aspect, the housing can include an upper end cap including a disk-shaped upper plate and a bushing for receiving the rotor shaft, a lower end cap including a disk-shaped lower plate and a bushing for receiving the rotor shaft, and a shell including a cylindrical sidewall that extends from the upper plate to the lower plate.

According to another aspect, alone or in combinations with any other aspect, the fluid gap can be defined between the upper rotor surface and the upper plate, between the lower rotor surface and the lower plate, and between the rotor edge surface and the shell.

DESCRIPTION

Magnetorheological Fluids

A magnetorheological (MR) fluid is an active material that changes its rheological behavior in the presence of a magnetic field. The fluid consists of micron-sized, magnetically polarizable particles suspended in a carrier medium, such as mineral oil or silicone oil. When a magnetic field is applied to the fluid, the particles within the fluid form chains, which inherently changes the MR fluid's viscosity. This effect is both completely reversible and controllable. In the presence of a shearing force or fluid flow pressure, the fluid's yield strength is determined by the equilibrium of the breaking and reforming of its particle chains. The stronger the magnetic field through the MR fluid, the harder it will be to break the ferromagnetic particle chains, resulting in a higher MR fluid yield strength. The behavior of MR fluids is often modeled as a Bingham plastic with variable yield strength. Using this model, the MR fluid flow is governed by Bingham's equations:

$$\tau = \tau_{yd}(H) + \eta \frac{\omega r}{g} \qquad (Eq.\ 1)$$

where $\tau$ is the total yield stress (shear stress in this case since an MR brake operates in shear mode), $\tau_{yd}$ is the dynamic yield stress, which is a function of the magnetic field strength, H, $\eta$ is the fluid viscosity, $\omega$ is the angular velocity, r is the radius of the disk, and g is the fluid gap.

Figure 1A:
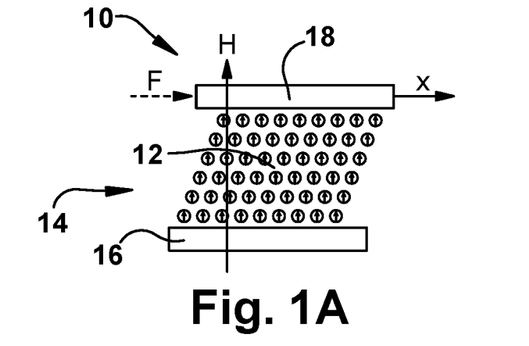
FIG. 1A illustrates a magnetorheological (MR) fluid device in a shear mode implementation as a brake/clutch.
Figure 1B:
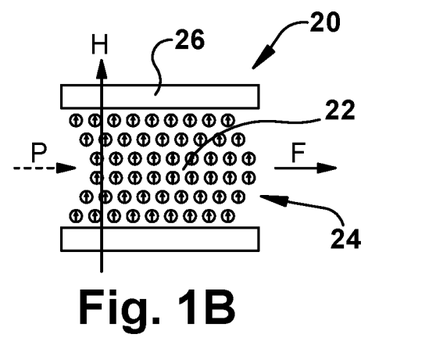
FIG. 1B illustrates an MR fluid device in a valve mode implementation as a servo-valve, shock absorber, or damper.

FIGS. 1A and 1B illustrate two utilization modes of an MR fluid. FIG. 1A depicts the MR fluid in shear mode, while FIG. 1B shows the MR fluid in valve mode. Shear mode devices include clutches and brakes. Typical valve mode devices can be servo-valves, shock absorbers, or dampers.

A shear mode device 10 is illustrated schematically in FIG. 1A. Referring to FIG. 1A, in a shear mode device 10 (e.g., a brake or clutch), the MR fluid 12, represented by small circular dots, fills a gap 14 between a stationary plate 16 and a moveable plate 18. The magnetic field runs through the MR fluid 12 in a direction that is perpendicular to the shearing force (F), as indicated generally by the small arrows in the MR fluid dots and the large arrow labeled H. The magnetic field H is also perpendicular to the moving surface, i.e., the shear surface, of the moveable plate 18. In the brake/clutch example of shear mode devices, the movable plate 18 is a rotor which rotates within a stationary housing, which includes the stationary plate. When the magnetic field is increased within an MR brake/clutch, it increases the yield stress of the MR fluid, which creates a braking torque on the rotor. As the strength of the magnetic field increases, so does the braking torque. A valve mode device 20 is illustrated schematically in FIG. 1B. Referring to FIG. 1B, in a valve mode device (e.g., servo valve, shock absorber, damper), the MR fluid 22, represented by small circular dots, is pushed through a narrow channel 24 of a housing 26, such as a cylinder. A shock absorber or damper implementation of the valve mode device 20, for example, can resemble a piston-cylinder device where the piston exerts pressure on the MR fluid in the cylinder. The viscosity of the MR fluid can be controlled through the application of a magnetic field to change the damping of piston movement in the cylinder 26.

In the valve mode device 20, the magnetic field runs through the MR fluid 22 running in a direction that is perpendicular to the fluid flow (F) in the channel 24, which is urged by pressure (P). The magnetic field running through the MR fluid 22 is indicated generally by the small arrows in the MR fluid dots and the large arrow labeled H. The magnitude of the magnetic field H affects the viscosity of the MR fluid, with an increase in the magnetic field producing a corresponding increase in viscosity. The increase in viscosity of the MR fluid increases the pressure P required to move the MR fluid through the channel.

MR Brake Design

Generally, magnetorheological (MR) brakes are categorized as either disk-type or drum-type by design. The distinguishing features of the two are the shape of the rotor and where the magnetic flux lines interact with the MR fluid to create a shear surface. In a disk-type MR brake, the rotor is slender and the MR fluid is energized to create a shear surface on the top and bottom of the rotor surface. Alternatively, a drum-type MR brake has a thicker rotor such that the energized MR fluid creates a shear surface at the outer radial surface of the rotor. Due to its slender design, a disk-type brake can take a much smaller form factor than a drum-type brake, but a drum-type brake has been shown to be advantageous when operated at higher angular velocities.

Figure 2:
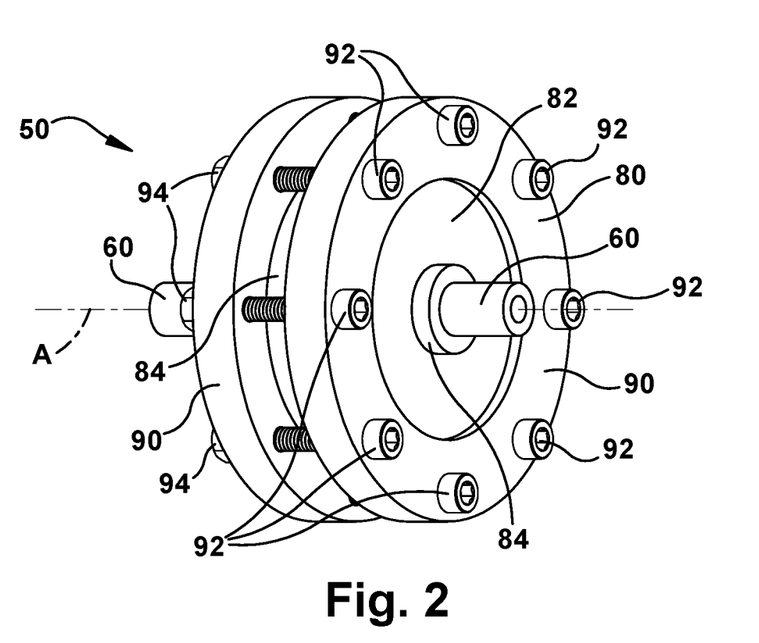
FIG. 2 is a perspective view of an MR brake design according to an example configuration of the invention.
Figure 3:
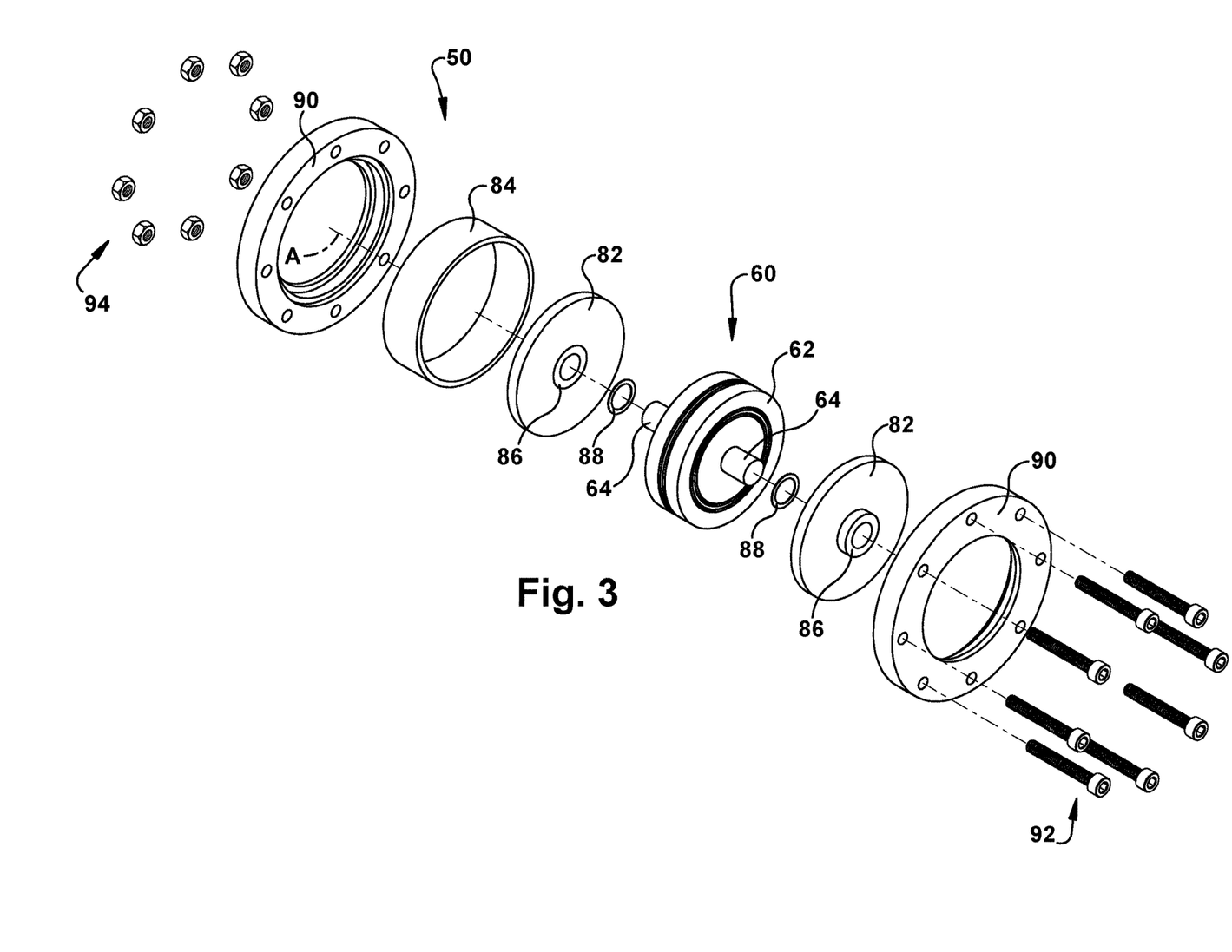
FIG. 3 is an exploded view of the MR brake design.
Figure 4:
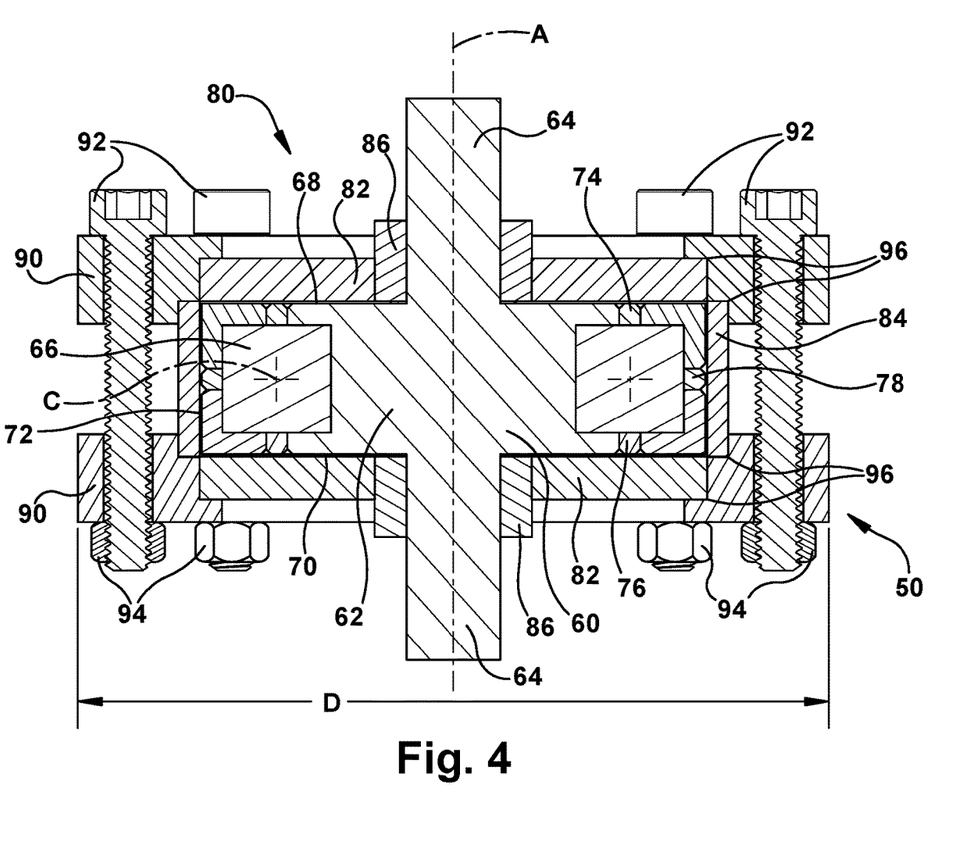
FIG. 4 is a sectional view of the MR brake design.

An example of an MR 50 brake according to the invention is illustrated in FIGS. 2-4. According to this design, the MR brake 50 combines features of both disk-type and drum-type brakes to utilizes all three shear surfaces of the rotor (top, side, and bottom) to apply the MR braking force. The MR brake 50 includes a rotor 60 having a shape that is somewhere between a disk and drum—slimmer than a drum and smaller in diameter than a disk. As set forth below, this rotor configuration helps maximize the torque to size ratio of the MR brake 50 by utilizing all of the available shear surfaces to apply the MR braking force.

Referring to FIGS. 3 and 4, the MR brake 50 is an assembly in which the rotor 60 is supported in a housing 80, both of which are centered on an axis A. The housing 80 includes a pair of end caps 82 and a cylindrical ring shell 84 that are received in and secured by a pair of housing rings 90 held together by a plurality (eight, as shown) of bolts 92 and nuts 94. The housing rings 90 include inner annular shoulders 96 (see FIG. 4) that receive and engage the end caps 82 and ring shell 84 to facilitate their assembly.

The rotor 60 includes a disk 62 supported by a shaft 64 having opposite ends received in respective ones of the end caps 82. The MR brake 50 can include components, such as bearings or bushings, indicated generally at 84 as being fitted to the end caps 82, for facilitating rotation of the rotor 60 relative to the housing 80. The bushings 84 can, for example, be bronze bushings press fitted into the end caps 82. The MR brake 50 can also include sealing features, such as O-rings, indicated generally at 86, for providing a fluid seal between interior of the housing 80 and the rotor shaft 64. This seal can be further facilitated by the use of sealants or adhesives, such as silicone glue, during the assembly of the MR brake components.

The rotor 60 includes an current-carrying coil 66 that is embedded in the disk 62 and centered on the axis A. The coil 66 has a generally toroidal configuration and is further configured, sized, and positioned so that it is positioned close to an upper face or surface 68 of the disk 62, a lower face or surface 70 of the disk, and a circumferentially extending outer (edge) face or surface 72 of the disk. In the example configuration illustrated in FIGS. 3 and 4, the coil 68 is positioned equidistant from these surfaces.

The rotor 60 also includes flux directing elements in the form of an upper ring 74, a lower ring 76, and an outer ring 78. The upper ring 74 is embedded in, and flush with, the upper surface 68 of the disk 62. The diameter of the upper ring 74 is selected to coincide with a circumferential centerline C of the coil 66. The lower ring 76 is embedded in, and flush with, the lower surface 70 of the disk 62. The diameter of the lower ring 76 is selected to coincide with the centerline C of the coil 66. The outer ring 78 is embedded in, and flush with, the outer surface 72 of the disk 62. The diameter of the outer ring 78 is selected to coincide with the centerline C of the coil 66.

The rotor 60 is constructed of a ferromagnetic material, such as mild steel. The rings 74, 76, and 78 are constructed of a low magnetic permeability material, such as aluminum. The end caps 82 and the ring shell 84 are constructed of low-carbon steel. The housing rings 90 are constructed of aluminum. The bolts 92 and nuts 94 are constructed of stainless steel. The construction of the MR brake 50 and the materials used in its construction provides the MR brake with advantageous braking performance characteristics.

The MR brake 50 can have a comparatively and advantageously small construction. In the example configuration of FIG. 4, the overall diameter D of the MR brake 50 can, for example, be about 38 mm (about 1.5 inches). The overall thickness/height of the MR brake 50 can be about 14.5 mm.

In the assembled condition, the MR brake 50 has two major components: the rotor 60 and the housing 80. The rotor 60 encapsulates the current-carrying coil 66, and is constructed of a low-carbon mild steel. The aluminum rings 74, 76, and 78 break up the steel body of the rotor 60 on the upper surface 68, lower surface 70, and edge surface 72, respectively. The housing includes the two endcaps 82 and the ring shell 84, both of which are inset into the housing rings 90. The rotor 60 is held within the housing 80 by the bushings 84, which allows relative rotation between the rotor and the housing.

Figure 5:
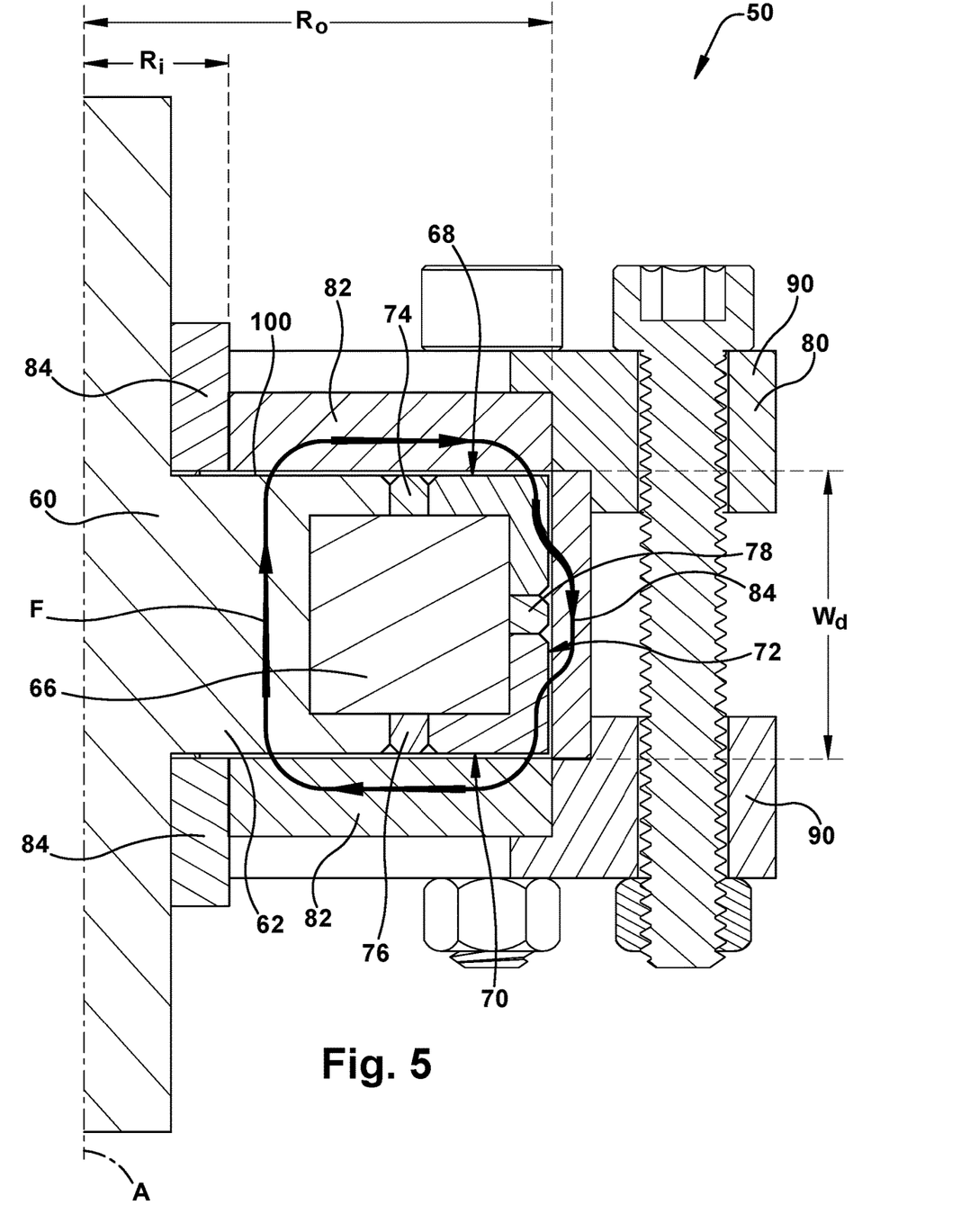
FIG. 5 is an enlarged partial sectional view of the MR brake design.

Referring to FIG. 5, in the assembled condition, the MR brake 50 is configured to have a thin gap 100 between the rotor 60 and the housing 80. This gap 100 extends along the upper surface 68, lower surface 70 and edge surface 72 of the rotor 60. The gap 100 can, for example be 0.1 mm. The gap 100 is filled with an MR fluid, which surrounds the disk 62 of the rotor 60 on the upper, lower, and edge surfaces 68, 70, 72. In the example configuration with the 38 mm overall diameter D described above, this amounts to about 0.16 ml of MR fluid.

In some applications, it may be desirable to reduce/minimize the size of the MR brake 50 and/or to increase/maximize the braking torque of the MR brake. The MR brake 50 configuration of FIGS. 2-4 can help to achieve both of these goals. To help increase the braking torque while still keeping the MR brake 50 as small as possible, the coil 66 is incorporated into the rotor disk 62. As a result, the MR brake 50 has an inverted disk-drum configuration, reversing the convention of most disk-type and drum-type designs, in which the coil is incorporated into the housing. This has the effect of moving the shear surface to the furthest edge of the brake in the radial direction, i.e., the inner surface of the ring shell 84, which lengthens the braking moment arm and effectively increases the braking torque for the size of the brake.

By increasing the braking torque in this manner, the braking torque to brake size (diameter) ratio is effectively increased. Because of this, the size/diameter of the MR brake 50 necessary to deliver a desired level of braking torque can be reduced. The inverted disk-drum configuration of the MR brake 50 thus can have the advantageous dual effect of increasing braking torque while reducing brake size.

Because the coil 66 is incorporated into the rotor 60 in the inverted disk-drum configuration of the MR brake 50 the rotor should remain stationary to prevent the lead/control wires that feed the coil from twisting. Accordingly, the MR brake 50 is configured so that the rotor 60 forms the stationary component of the brake while the housing 80 rotates around it. Due to the relatively small size and light weight of the subject MR brake configuration, the rotation of the housing around the rotor does not hinder the dynamics of the brake. In the example configuration of the MR brake 50, the diameter D (38 mm) and weight of the brake (about 67.8 grams). For example, the diameter of the MR brake of FIGS. 2-4 can be slightly larger than the diameter of a U.S. quarter (see FIG. 4) and can weigh only 67.8 grams. In this example configuration, there can be approximately 300 turns of wire that make up the coil 66.

In another configuration, a brush assembly could be coupled to the rotor shaft 64 to allow rotation of the rotor 60 relative to stationary housing. This would permit the inverted disk-drum implementation while avoiding a stationary rotor requirement.

MR Brake Design

The operation of the MR brake 50 is described below with reference to FIG. 5, which shows an enlarged, right-side half of the brake with dimensional callouts and the approximate path of the lines of magnetic flux produced by excitation of the current-carrying coil 66. In this illustration, Ri and Ro are the inner and outer radii of the rotor disk 62, respectively. $R_o - R_i$ is the length of the active MR fluid region in the gap 100 along the upper and lower surfaces 68, 70 of the disk 62. $W_d$ is the width of the active MR fluid region along the outer surface 72 of the disk 62. The width of the fluid gap 100 width surrounding the disk 62 on the upper, lower, and outer edge surfaces 68, 70, 72 is represented by g.

Normally, the magnetic flux would flow freely through and be contained primarily within the disc 62, due to its mild steel construction. Advantageously, the rings 74, 76, 78 are constructed of aluminum, which has a low magnetic permeability, and are embedded in the disc 62 adjacent the coil 66 on three sides. The magnetic circuit produced by the coil 66, which is made up of series of closed loop paths containing magnetic flux, is illustrated generally by the arrows labeled F in FIG. 5. Because the aluminum rings 74, 76, 78 have a low magnetic permeability, the majority of the lines of magnetic flux follow the high magnetic permeability path (path of least reluctance) of the mild steel components of the rotor and housing, causing lines of magnetic flux F to cross the gap 100 and the MR fluid contained therein in order to traverse the aluminum rings. Once each ring is traversed, the lines of flux F crosses the gap 100 and the MR fluid back to the disc 62. Advantageously, due to this construction, the lines of flux F crosses the fluid gap 100 a total of 6 times.

The braking torque can be derived by integrating the shear stress along the disk surface area:

$$T = 2\int_{R_i}^{R_o} \tau(2\pi r)rdr + \int_0^{W_d} \tau(2\pi R_o)R_o dw + T_{fric} \quad \text{(Eq. 2)}$$

where T is the total braking torque and $T_{fric}$ is the additional torque due to friction within the brake due to manufacturing practices. $R_i$ and $R_o$ are the inner and outer radii of the disk, respectively. $W_d$ is the width of the active MR fluid region of the side of the disk (see FIG. 2). The first integration term in (Eq. 2) is the braking torque of the top and bottom surface of the rotor, and the second integration term is the braking torque on the side surface. After substituting (Eq. 1) into (Eq. 2) and simplifying, the total braking torque becomes:

$$T = 4\pi \int_{R_i}^{R_o} \tau_{yd}(H(r)) \cdot r^2 dr + \\ 2\pi R_o^2 \int_0^{W_d} \tau_{yd}(H(w))dw + \pi\eta \frac{\omega}{g}[(R_o^4 - R_i^4) + 2R_o^3 W_d] + T_{fric} \quad \text{(Eq. 3)}$$

Numerical integration must be used to solve this, since the yield stress changes along the MR fluid gap radius. The first integration term accounts for the braking torque from the top and bottom surfaces 68, 70 of the rotor 62, while the second integration term is the braking torque from the side/edge surface 72 of the rotor. The third term is the contribution of the viscous flow on all three surfaces 68, 70, 72 of the rotor 62. Finally, the fourth term is the contribution of additional friction from manufacturing practices. Equation 3 is solved below in the section entitled FEM Modeling and Design Optimization. Extensive dynamic modeling of MR brakes can be found.

Those skilled in the art will appreciate that the braking characteristics can be affected by the properties of the MR fluid implemented in the MR brake 50. One specific MR fluid that can be used in the MR brake 50 is MRF-140CG (LORD Corporation, Cary, N.C., USA), which has a yield stress of 26-54 kPa for a magnetic field strength of 50-150 kA/m. The viscosity of the fluid at 40° C. is 0.280 Pa-s. This technical data was used to perform FEM modeling described in the following section.

FEM Modeling and Design Optimization

In addition to maximizing the moment arm and number of shear surfaces within the brake, the configuration of the MR brake 50 implements a serpentine pattern of magnetic flux lines to increase the number of crossings the magnetic field would have within the MR fluid, which ultimately increases the braking torque. This is done by incorporating the aluminum rings 74, 76, 78 into the rotor 60 to alter the lines of flux F of the magnetic field produced by the coil 66. Aluminum has a very low magnetic permeability in comparison with carbon steel, and the majority of the lines of magnetic flux tend to follow the path of least reluctance. Thus, when aluminum is positioned next to a carbon steel, such as a low-carbon steel, in the presence of a magnetic field, the lines of magnetic flux will tend to concentrate within the higher permeability steel material, rather than the low permeability aluminum.

Using this principle, the lines of magnetic flux F are routed or forced to cross the MR fluid gap 100 between the rotor 60 and the housing 80 multiple times. In the illustrated example configuration, the aluminum rings 74, 76, 78 are added to each face 68, 70, 72 of the rotor disk 62. Since the surrounding low-carbon steel within both the rotor 60 and the housing 80 (e.g., the housing endcaps 82) have a relative permeability orders of magnitude larger than the aluminum rings 74, 76, 78, lines of magnetic flux tends to concentrate within the steel. This forces the lines of magnetic flux F to cross the MR fluid gap 100 a total of six times. Comparing this to traditional disk-type or drum-type MR brakes, which have only two magnetic flux crossings, the configuration of the MR brake 50 produces a substantial increase in the magnetic flux density through the MR fluid, which further increases the braking torque. Although the number of crossings can be limited by the small brake size constraint as well as complexity in manufacturing such small parts, a greater number of crossings could be achieved using additional aluminum rings or other structures.

Figure 6:
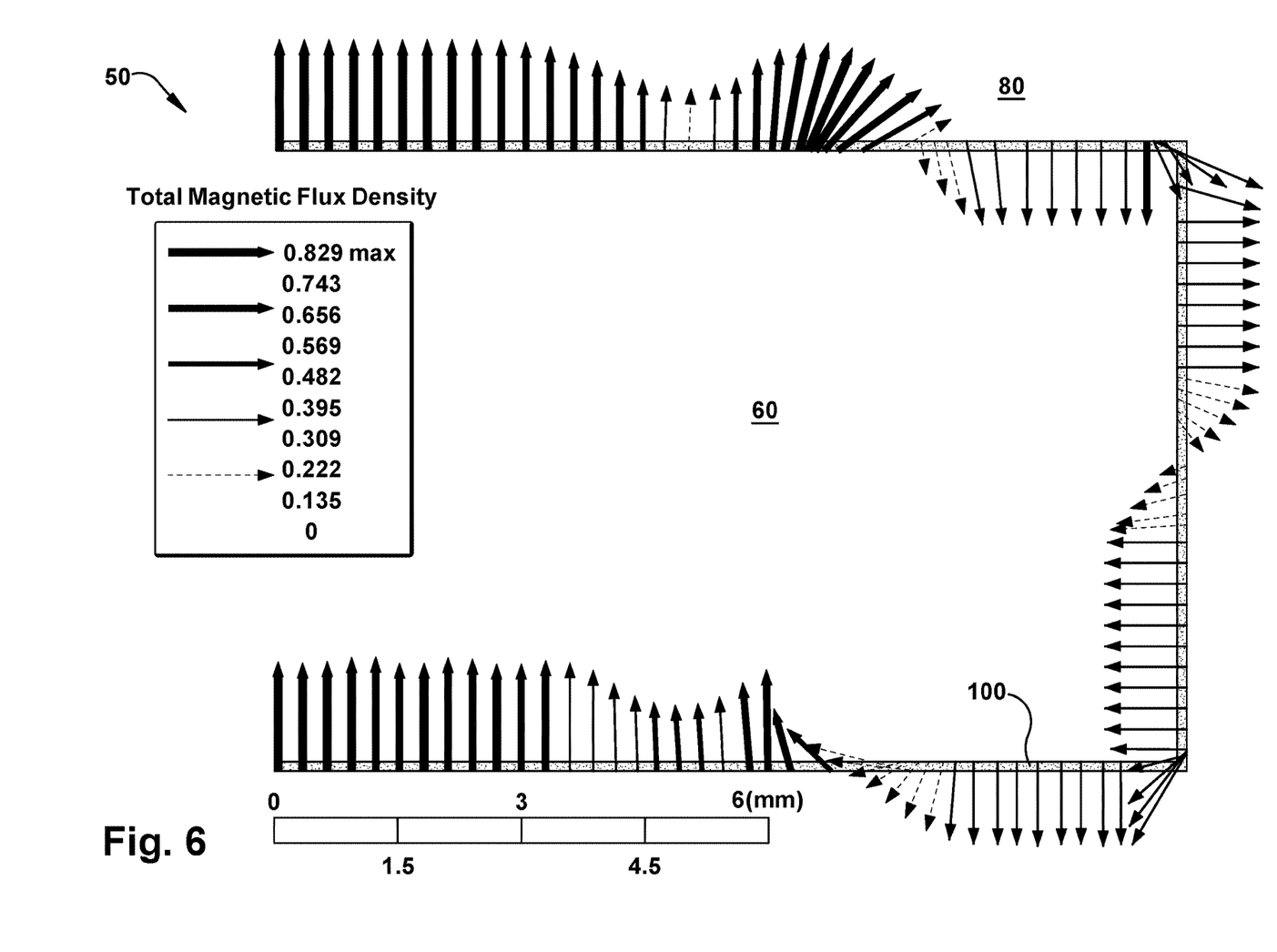
FIG. 6 is a diagram illustrating the total magnetic flux density within the MR fluid of the MR brake design.

The total magnetic flux density within the MR fluid of the MR brake 50 is illustrated in FIG. 6, which illustrates schematically, the housing 80, the rotor 60, and the MR fluid gap 100. The scale shown in FIG. 6 shows the magnification for these components, which are sized to approximate the dimensions for the example configuration of the MR brake 50 described herein. In FIG. 6, the thickness or density of the arrows shows the magnitude of the magnetic flux density at that particular location along the MR fluid gap 100. The directions of the arrows illustrate the direction and redirection of the lines of magnetic flux F caused by the configuration of the aluminum rings 74, 76, 78.

The design of the MR brake 50 was modeled and optimized using the magnetostatic module of ANSYS finite-element method (FEM) software (ANSYS, Inc., Canonsburg, Pa., USA). All material and magnetic properties, including both the B-H curve and the yield stress versus magnetic field strength (H) provided by LORD Corporation for the MRF-140CG MR fluid, were entered into the software to perform the simulation. The design was optimized based on the total magnetic flux density within the MR fluid gap 100, with the goal of maximizing the flux density within the fluid to maximize the braking torque while keeping the MR brake 50 as small as possible.

Looking at Eq. 1, the dynamic shear stress created by the MR fluid is proportional to the magnetic flux density. Therefore, by increasing the magnetic flux density normal to the shear surfaces within the fluid gap 100, one can increase the braking torque that the MR brake 50 can produce (Eq. 3). There are three ways to increase magnetic flux density within the MR fluid gap 100: 1) increase the number of coils 66, 2) increase the current, and 3) minimize the size of the fluid gap 100.

Given that there is a tradeoff between size of the coil 66 and current density, one must optimize the first two variables to obtain the desired magnetic flux density. Thicker wire used for the coils 66 results in larger current density running through the wire, but it requires a larger coil, which may not be constructive for a miniature MR brake design. A larger number of coil turns can be achieved with a thinner wire. If, however, the wire is too thin, the coil 66 can overheat, even with relatively low current. By reducing the size of the third variable, the fluid gap 100, one increases the magnetic flux since the relative permeability of the MR fluid is much smaller than that of low-carbon steel.

In addition to these three factors which affect magnetic flux density to increase braking torque, the geometry of the MR brake 50 itself, namely the radius and thickness/height of the rotor disk 62, play an important role. Increasing the radius of the disk 62 results in a longer moment arm and increased braking torque. Increasing the thickness/height of the disk 62 width would increase the total surface area where shear stress is applied, which would also increase braking torque. Consequently, to maximize braking torque, the MR fluid gap 100 should be minimized, and the number of turns of the coil 66, the radius of the disk 62, and the thickness/height of the disk should be maximized.

The magnetic flux density within the MR fluid gap 100 is maximized by optimizing the width and height of the aluminum rings 74, 76, 78 and dimensions of the steel flux conductor, i.e., the disk 62, within the rotor 60. For optimization within the desired small size constraints of the example configuration of the MR brake 50, the outer brake dimensions were held constant at 38 mm diameter and 14.5 mm thickness/height. Optimization of the dimensions of the aluminum rings 74, 76, 78 resulted in a 1 mm×1 mm cross section and ensured minimal lines of flux were able to pass through the aluminum material.

Simulations showed the lines of magnetic flux were forced perpendicularly through the MR fluid gap 100 and then flowed back perpendicularly through the gap on the other side, resulting in 2 crossings per rotor face. As stated above, for maximum braking torque the MR fluid gap 100 should be minimized. In the example configuration, the fluid gap 100 was 0.1 mm across.

Finally, the thickness of the steel outer housing, i.e., the end caps 82 and the ring shell 84, was taken into account. Thicker steel allows for greater magnetic flux density within the brake housing 80, but given the current density limit through the electromagnetic coil 66 (limited by wire gauge and rated current input), increasing the thickness of these steel housing components 82, 84 led to diminishing returns on the amount of flux density transported therethrough. An optimized dimension of 2 mm thickness for the end caps 82 and 1 mm thickness for the ring shell 84, both constructed of low-carbon steel, was chosen.

Figure 7A:
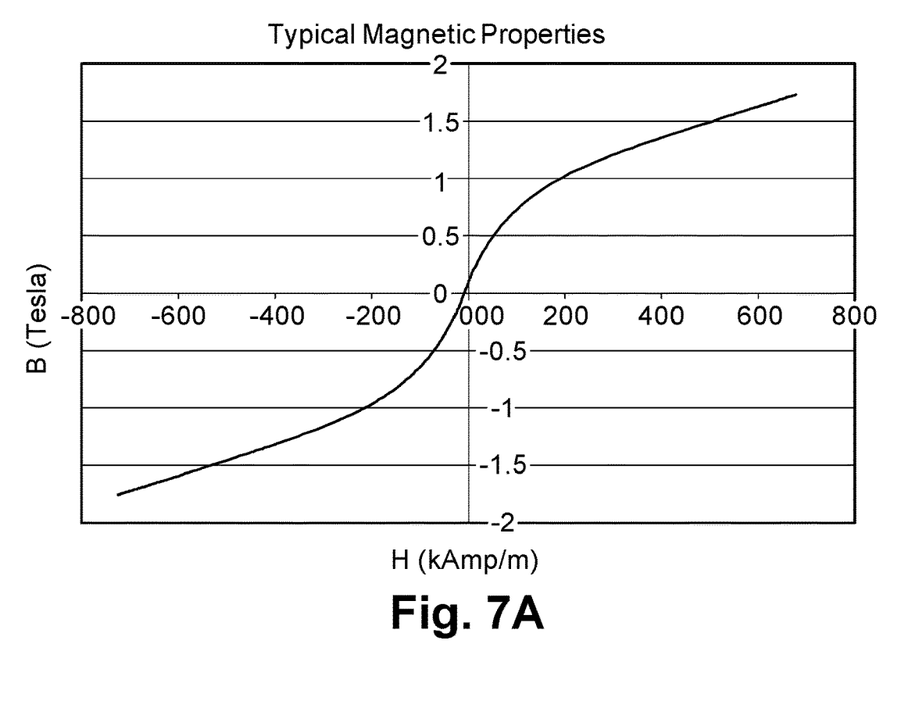
FIGS. 7A and 7B are charts illustrating magnetic properties associated with the MR fluid used in the MR brake design.
Figure 7B:
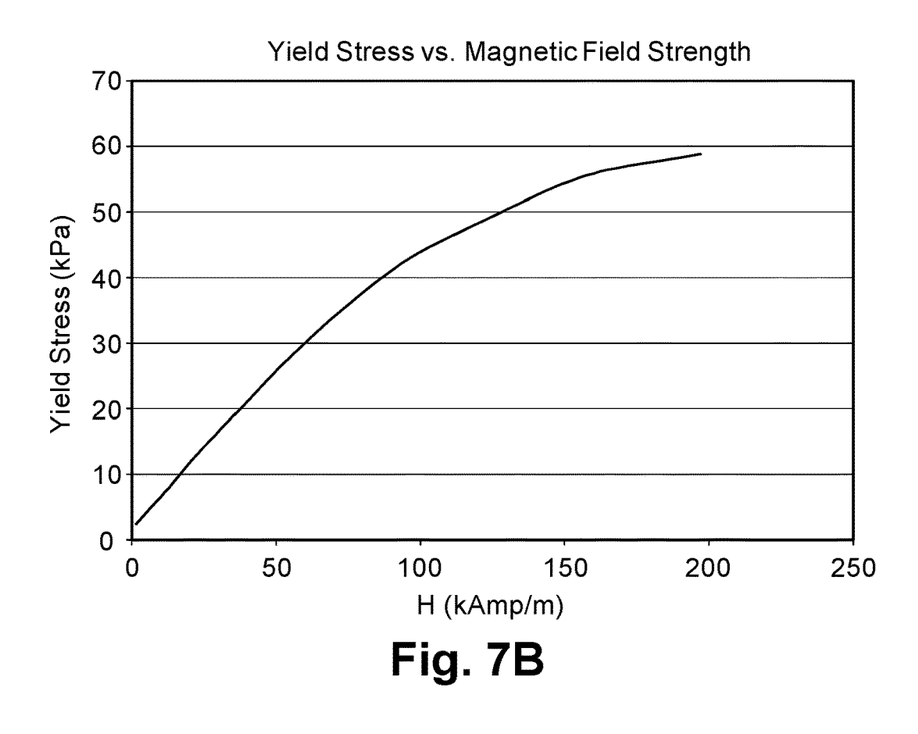

FIG. 7A shows the B-H curve for the MR brake 50. FIG. 7B shows the relationship between the MR fluid yield stress (kPa) and the magnetic field strength (kAmp/m). Both of these were used in the ANSYS FEM simulation to optimize braking torque.

Based on the FEM model of the illustrated example configuration of the MR brake 50, the electromagnetic coils 66 produced an average magnetic flux density of 0.54 T through the MR fluid gap 100, which correlates to a yield stress of approximately 30 kPa, based on the manufacturer's specifications. Given the dimensions of the MR brake 50 and these shear stress values, the estimated braking torque output was calculated via numerical integration using Eq. 3 to be 409 N·mm. The contribution of torque on the top, bottom, and edge/side of the rotor 60 was 117 N·mm, 118 N·mm, and 174 N·mm, respectively.

MR Brake Experiments

To test the MR brake 50, a dynamometer test bed was created. Instead of measuring the torque output of the motor, the braking torque of the MR brake 50 was measured. In this setup, a brushed DC motor (Maxon Precision Motors, Inc., Fall River, Mass., USA) was attached to the housing 80 of the MR brake 50. The rotor 60 of the MR brake 50 was coupled to a Mini40 torque sensor (ATI Industrial Automation, Apex, N.C., USA). The DC motor was sized such that it would not stall during experimental testing with the brake outputting its max torque. Both the DC motor and the MR brake 50 were powered by a 30V/3 A DC power supply (Uniteq Corporation), and an oscilloscope was used to capture rise time data.

The first set of experiments was aimed at establishing the braking torque output of the MR brake 50. There were three goals to these experiments: 1) establish a relationship between input current and output torque, 2) from this relationship, find the magnetic flux saturation limit, and 3) determine the optimal current input for the MR brake 50. To accomplish the first goal, we measured the braking torque of the MR brake at 0.1 A input current intervals from 0 to 1.5 A (see FIG. 8A). Each braking torque output test started with the DC motor freely spinning the MR brake housing 80. Then, the MR brake 50 was engaged by supplying the electromagnetic coils 66 within the brake with a specified amount of current.

Using the torque sensor and data acquisition software provided by ATI Industrial Automation, we measured the braking torque. Without the MR brake 50 engaged, we measured approximately 15 N·mm of frictional torque within the brake. This can be attributed to friction between the shaft and bushings and the MR fluid. Since the gap between the rotor and the housing where the MR fluid resides is so small (~0.1 mm), there is a possibility that some friction is caused by the interaction of the rotor 60 with the housing 80. From FIG. 8A, it can be seen that there is a linear relationship between current and braking torque for input currents of 0.5 A and less ($R^2=0.995$). After 0.5 A, magnetic saturation begins to take place within the steel and limits the braking torque output. By 1.5 A, the MR brake 50 is at its braking torque limit, as the magnetic flux density within the steel has reached full magnetic saturation.

From these experiments, it can be seen that 0.5 A is the optimal input current. Over 0.5 Amps would result in diminishing braking torque output and increased wire temperature. Especially since small diameter wire (30 AWG) is used for the electromagnetic coils 66 in this design, going much over 0.5 Amps for a prolonged amount of time would be detrimental to the wire within the MR brake 50. Even at 0.5 Amps, the wire is beyond its current rating, but given that the MR brake 50 will be activated or energized intermittently or for short durations of time, running 0.5 Amps through the coils 66 is acceptable.

Figure 8A:
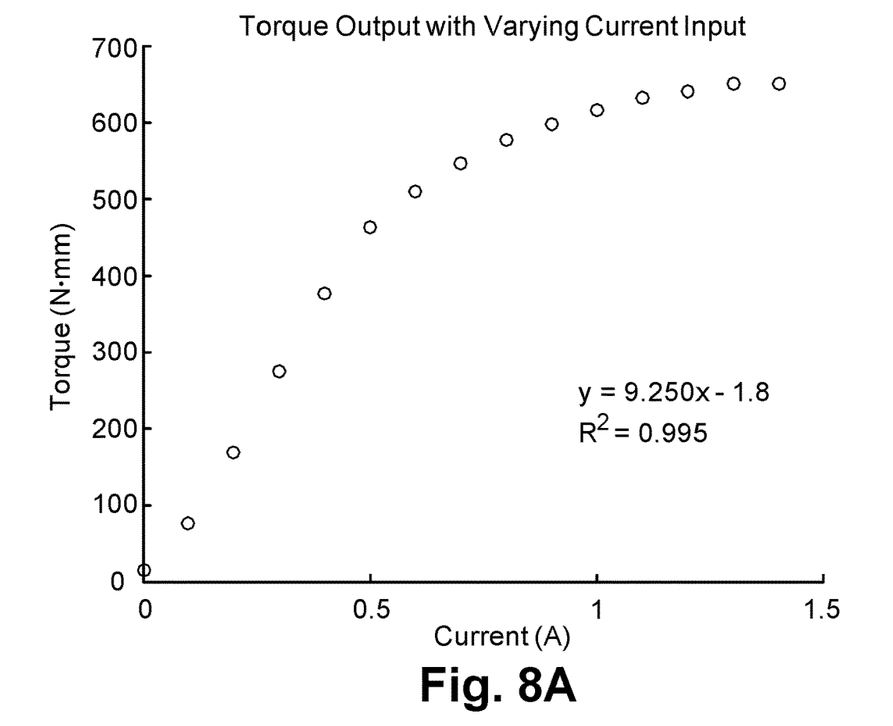
FIGS. 8A and 8B are charts illustrating current response and performance characteristics of the MR brake design.

The results from FIG. 8A show the controllability of the MR brake 50, determined experimentally. Thus, any control scheme would use this data to vary the input current to the brake for the desired output braking torque. As stated above, 0.5 A was found to be the optimal input current for the example MR brake configuration. At this current, the MR brake 50 outputs approximately 462 N·mm.

An oscilloscope was used in the experimental setup to obtain information about the current within the coils 66 of the MR brake 50. Experiments aimed at determining the response time of the MR brake 50 started off the same as the braking torque experiments described above. With the DC motor freely spinning, the brake was engaged by sending 0.5 Amps of current through the coils using the power supply. A maintained push button switch was added in-line between the power supply and the MR brake 50 because it was observed that there was significant lag time in the rise of current when switched on from the power supply itself. Data from the torque sensor was collected at 5 kHz and matched up with the oscilloscope data (see FIG. 8B). Since the oscilloscope measures changes in voltage, it was used to probe across a 0.44 Ohm resistor placed in series after the MR brake 50, and using Ohms law, the measured voltage drop across the resistor was converted to current within the circuit.

Figure 8B:
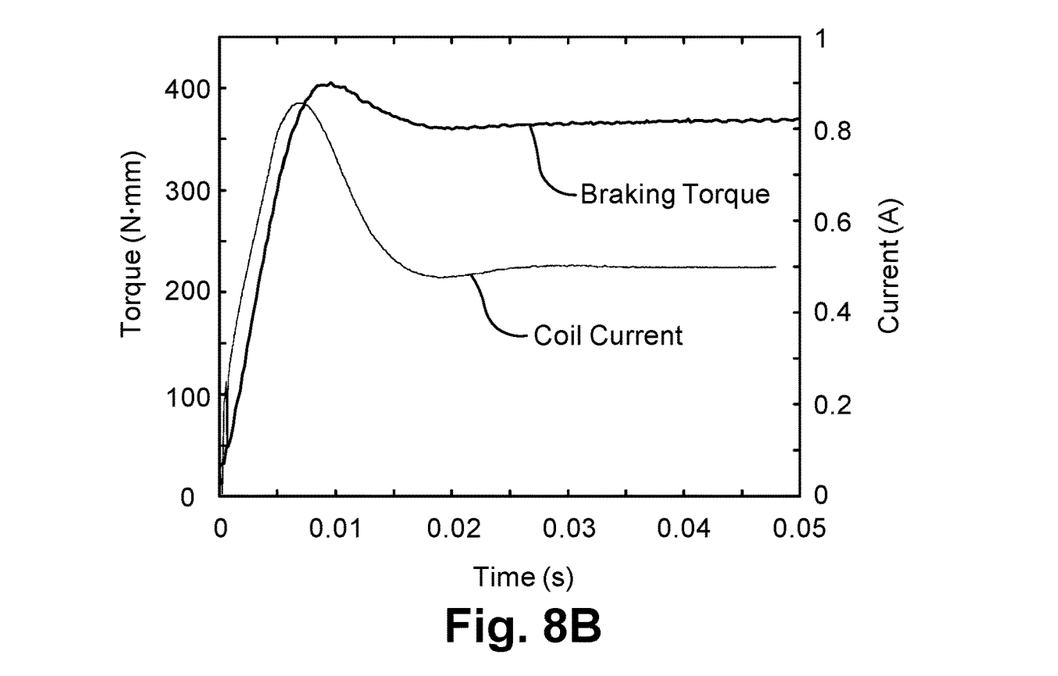

Results of rise time testing of the MR brake 50 are shown in FIG. 8B. The dark line in FIG. 8B shows the braking torque collected from torque sensor as a function of time. The light line in FIG. 8B shows the rise in current within the electromagnetic coils 66 from 0 to 0.5 A, measured by the oscilloscope. Rise time of the MR brake 50 is approximately 6.7 ms.

From FIG. 8B, it can be seen that the increase in braking torque of the MR brake 50 mirrors the rise in current within the electromagnetic coils 66. There is a slight lag between the rise in current and the braking torque, but some of this can be attributed to slight voltage fluctuations (in the first millisecond) when the press switch initiates the contact with the power supply. Some of this noise has been smoothed out, but the fluctuations are still present in the current at the start of the current rise. Just as in FIG. 8A, the braking torque increases linearly with increasing current. The current overshoots its intended 0.5 Amps, but quickly settles to the specified current. As a result, there is a corresponding slight overshoot in braking torque before it heads towards its steady state value.

Miniature Brake Comparison

Based on the above experimentation, the MR brake 50 can be compared with similar sized brakes, both in existing literature and in commercial use. Table I shows a comparison between several different types of miniature brakes, including electromagnetic (EM), magnetic particle (MP), piezoelectric (PZT), and magnetorheological (MR). While each of these brakes was chosen due to its miniature size, braking torque output and response time were of particular interest in the comparison.

TABLE I

Brake Comparison Among Miniature Brakes

| Type/Model | Magneta EM Model: 14.110.02.103 | Placid Industries MP Model: B1 | Magtrol HB Model: 3M | Gogola et al. PZT | Blake et al. MR | MR Brake 50 MR |
|---|---|---|---|---|---|---|
| Torque (N·mm) | 300 | 113 | 20 | 180 | 189 | 462 |
| Rise Time (ms) | 15 | 12 | | 2.6 | 229[1] | 6.7 |
| Weight (g) | 63 | 255 | 110 | 560 | 84[2] | 68 |
| Diameter (mm) | 39 | 40 | 31.8 | 71 | 251 | 38 |
| Width (mm) | 19 | 27 | 18.6 | 38 | 18[1] | 14.5 |
| Volume (mm$^3$) | 22,697 | 33,929 | 14,772 | 150,449 | 8,836 | 16,445 |
| Torque/Weight (N·mm/g) | 9.52 | 0.44 | 0.18 | 1.64 | 2.25 | 6.79 |
| Torque/Volume (N·mm/mm$^3$) | 0.026 | 0.003 | 0.001 | 0.001 | 0.021 | 0.028 |

EM = Electromagnetic,
MP = Magnetic Particle
HB = Hysteresis,
PZT = Piezoelectric
MR = Magnetorheological
[1]Inferred from figure in Blake.
[2]Includes gear train.

Of all the brakes shown in Table I, the PZT-actuated proportional drum brake had the fastest response, with a 2.6 ms rise time. Coming in second with a 6.7 ms rise time, the MR brake 50 design according to the example configuration proves sufficiently fast to be used in haptic interfaces, which require fast response times (modulation at a high frequency) so that virtual walls or fixtures may be perceived without vibration or "stickiness." MR brakes are commonly used in the literature for passive, haptic interfaces due to their fast response time.

It is interesting to note that the other MR brake in this comparison has a significantly slower rise time. Since the rise time of the MR fluid used is on the order of a couple milliseconds, the limiting factor might be the power supply and the current rise. Looking at the braking torque of each brake, we see that the electromagnetic brake from Magneta has the highest torque output at 600 N·mm. Again, coming in second is the MR brake 50 design according to the example configuration, with a braking torque output of 462 N·mm, which is over twice as much as the leading miniature MR brake in the literature.

Adjusting for the size of the brake, the MR brake 50 has the greatest torque to volume ratio of all the brakes compared, regardless of type. The closest comparable brake in both size and torque output is the electromagnetic brake from Magneta, but one inherent advantage of the MR brake versus the EM brake is that the MR brake's output torque is fully controllable. As opposed to an EM brake whose current to torque relationship is highly non-linear, the braking torque of the MR brake can be precisely controlled by varying the input current. This feature, along with the faster response time, makes the MR brake extremely favorable for haptic applications.

Designed as a blend of both a disk and drum brake, the MR brake 50 according to the example configuration utilizes a serpentine pattern of magnetic flux lines to obtain high braking torque by creating a shear surface on all three surfaces of the rotor (top, side, and bottom). To further increase braking torque and to enable this design, the placement of the electromagnetic coils was inverted, placing them within the rotor 60 as opposed to the housing 80. This maximized the moment arm of the MR brake 50 to the outer edge of the housing 80 in an effort to maximize braking torque within a miniature MR brake design.

Given that the design of the MR brake 50 offers a mix of high braking torque and fast response rate in a very small form factor, it is well-suited for use in haptic devices, especially in wearable or handheld devices. It can also be used in passive, cooperatively controlled robotic systems. By implementing the MR brake 50 in joints of a robotic system that is cooperatively controlled by a human user, no-fly zones or hard stops can be applied. This, along with its inherent passivity, meaning the brake cannot impart any energy into the robotic system, lends itself well to a cooperatively-controlled surgical robotic system.

One possible application for the MR brake 50 could be in assisting a surgeon in performing a mastoidectomy procedure, which is the removal of bone from the mastoid region of the skull for access into the inner ear structures. During this procedure, the surgeon must maneuver a surgical drill within a millimeter of multiple vital structures (nerves, blood vessels, etc.) imbedded within the bone. If aided by a completely passive robotic system utilizing the MR brake 50, the surgical drill could be stopped from hitting any vital structure during the delicate procedure. As just one of many applications, the MR brake 50 has great potential in the fields of haptics, human robotic collaboration, and surgical robotics.

What have been described above are examples of the present invention. It is, of course, not possible to describe every conceivable combination of components or methodologies for purposes of describing the present invention, but one of ordinary skill in the art will recognize that many further combinations and permutations of the present invention are possible.

For example, the MR brake 50 is not limited to the inverted disk-drum configuration illustrated in FIGS. 2-5. The MR brake 50 could have a more conventional configuration in which the coils are implemented in the housing, which remains stationary while the rotor rotates relative to it. This configuration can be advantageous, for example, where reducing/minimizing brake size and increasing/maximizing braking torque is not necessary. In this configuration, the aluminum rings could be embedded in the housing in order to force the lines magnetic flux to cross the MR fluid gap 100 and provide the advantageous braking torque operation disclosed herein.

Additionally, the inventive, multiple fluid gap crossing lines of flux configuration implemented in the MR brake 50 can also be implemented in other brake designs, such as a MR drum brake design. In this example, an MR drum brake that is roughly the same size can include aluminum as a lines of flux director to obtain multiple, e.g., four, magnetic flux crossings in a drum-type MR brake configuration.

The present invention is intended to embrace all such alterations, modifications, and variations encompassed by the following claims.

We claim:

1. A magnetorheological (MR) brake comprising:
a rotor constructed at least partially of a ferromagnetic material;
a housing that supports the rotor such that the rotor and the housing are rotatable relative to each other about an axis, wherein the housing and rotor are configured such that a fluid gap is defined between the housing and an upper surface of the rotor, between the housing and a lower surface of the rotor, and between the housing and an annular edge surface of the rotor, and wherein portions of the housing adjacent the rotor are constructed at least partially of a ferromagnetic material;
a magnetorheological (MR) fluid disposed in the fluid gap;
a current-carrying coil excitable to generate a magnetic field that is concentrated in the ferromagnetic portions of the rotor and the housing and acts on the MR fluid; and
at least one element constructed of a material having low magnetic permeability configured to route the lines of magnetic flux through surrounding higher permeability material on opposite sides of the fluid gap to route the lines of magnetic flux to transition across the fluid gap multiple times and act on the MR fluid disposed in the fluid gap, wherein the at least one element comprises a first element embedded in the upper surface of the rotor, a second element embedded in the lower surface of the rotor, and a third element embedded in the edge surface of the rotor.

2. The MR brake recited in claim 1, wherein the at least one element constructed of a material having low magnetic permeability is configured to cause the magnetic flux to transition across the gap adjacent the upper surface of the rotor, the lower surface of the rotor, and the edge surface of the rotor.

3. The MR brake recited in claim 1, wherein the material having low magnetic permeability comprises aluminum.

4. The MR brake recited in claim 1, wherein the first, second, and third elements are ring-shaped.

5. The MR brake recited in claim 1, wherein the current-carrying coil is housed in the rotor, the rotor being configured in use to be mounted stationary, the housing being rotatable relative to the rotor about the axis.

6. The MR brake recited in claim 1, wherein the rotor comprises a ferromagnetic disk and a shaft for supporting the rotor in the housing, and wherein the current-carrying coil is toroidal and housed in the disk.

7. The MR brake recited in claim 6, wherein each of the first, second, and third elements comprises a ring-shaped element that is embedded in the disk and extends from a surface of the disk to adjacent the current-carrying coil.

8. The MR brake recited in claim 7, wherein each of the ring-shaped elements are configured to extend along the surface of the current-carrying coil.

9. The MR brake recited in claim 6, wherein the material having low magnetic permeability comprises aluminum.

10. The MR brake recited in claim 6, wherein:
the first element extends from the upper surface of the disk to adjacent the current-carrying coil;
the second element extends from the lower surface of the disk to adjacent the current-carrying coil; and
the third element extends from the edge surface of the disk to adjacent the current-carrying coil.

11. The MR brake recited in claim 6, wherein the housing comprises an upper end cap comprising a disk-shaped upper plate and a bushing for receiving the rotor shaft, a lower end cap comprising a disk-shaped lower plate and a bushing for receiving the rotor shaft, and a shell comprising a cylindrical sidewall that extends from the upper plate to the lower plate.

12. The MR brake recited in claim 10, wherein the fluid gap is defined between the upper rotor surface and the upper plate, between the lower rotor surface and the lower plate, and between the rotor edge surface and the shell.

13. The MR brake recited in claim 1, wherein the first element comprises a ring embedded in the upper surface of the rotor, the second element comprises a ring embedded in the lower surface of the rotor, and the third element comprises a ring embedded in the edge surface of the rotor.

14. The MR brake recited in claim 1, wherein the first element comprises a ring embedded flush with the upper surface of the rotor, the second element comprises a ring embedded flush with the lower surface of the rotor, and the third element comprises a ring embedded flush with the edge surface of the rotor.

15. A magnetorheological (MR) brake comprising:
a rotor constructed at least partially of a ferromagnetic material;
a housing that supports the rotor such that the rotor and the housing are rotatable relative to each other about an axis, wherein the housing and rotor are configured such that a fluid gap is defined between the housing and the rotor, and wherein portions of the housing adjacent the rotor are constructed at least partially of a ferromagnetic material;
a magnetorheological (MR) fluid disposed in the fluid gap;
a current-carrying coil excitable to generate a magnetic field that is concentrated in the ferromagnetic portions of the rotor and the housing and acts on the MR fluid; and
at least one element embedded in at least two of an upper surface, lower surface, and edge surface of the rotor and positioned adjacent the fluid gap, the at least one element being constructed of a material having low magnetic permeability configured to route the lines of magnetic flux through surrounding higher permeability material on opposite sides of the fluid gap to route the lines of magnetic flux to transition across the fluid gap multiple times and act on the MR fluid disposed in the fluid gap.

16. The MR brake recited in claim 15, wherein each of the at least one elements comprises an aluminum ring.

17. The MR brake recited in claim 15, wherein the rotor comprises a ferromagnetic disk and a shaft for supporting the rotor in the housing, and wherein the current-carrying coil is toroidal and housed in the disk.

18. The MR brake recited in claim 15, wherein each of the at least one elements comprises a ring-shaped element that is embedded in the disk and extends from the fluid gap to adjacent the current-carrying coil.

19. The MR brake recited in claim 15, wherein the at least one element comprises:
   a first ring-shaped element that is embedded in the disk and extends from the upper surface of the disk to adjacent the current-carrying coil;
   a second ring-shaped element that is embedded in the disk and extends from the lower surface of the disk to adjacent the current-carrying coil;
   a third ring-shaped element that is embedded in the disk and extends from the edge surface of the disk to adjacent the current-carrying coil.

20. A magnetorheological (MR) brake comprising:
   a rotor constructed at least partially of a ferromagnetic material;
   a housing that supports the rotor such that the rotor and the housing are rotatable relative to each other about an axis, wherein the housing and rotor are configured such that a fluid gap is defined between the housing and the rotor, and wherein portions of the housing adjacent the rotor are constructed at least partially of a ferromagnetic material;
   a magnetorheological (MR) fluid disposed in the fluid gap;
   a current-carrying coil excitable to generate a magnetic field that is concentrated in the ferromagnetic portions of the rotor and the housing and acts on the MR fluid; and
   at least one element constructed of a material having low magnetic permeability configured to route the lines of magnetic flux through surrounding higher permeability material on opposite sides of the fluid gap to route the lines of magnetic flux to transition across the fluid gap multiple times and act on the MR fluid disposed in the fluid gap, wherein the rotor comprises a ferromagnetic disk and a shaft for supporting the rotor in the housing, and wherein the current-carrying coil is toroidal and housed in the disk, and wherein the at least one element constructed of a material having low magnetic permeability comprises:
   a first ring-shaped element that is embedded in the disk and extends from an upper surface of the disk to adjacent the current-carrying coil;
   a second ring-shaped element that is embedded in the disk and extends from a lower surface of the disk to adjacent the current-carrying coil; and
   a third ring-shaped element that is embedded in the disk and extends from an edge surface of the disk to adjacent the current-carrying coil.

* * * * *

UNITED STATES PATENT AND TRADEMARK OFFICE
CERTIFICATE OF CORRECTION

| | |
|---|---|
| PATENT NO. | : 11,815,142 B2 |
| APPLICATION NO. | : 17/428052 |
| DATED | : November 14, 2023 |
| INVENTOR(S) | : Wellborn et al. |

Page 1 of 1

It is certified that error appears in the above-identified patent and that said Letters Patent is hereby corrected as shown below:

In the Specification

In Column 1, after Line 12 insert:
--GOVERNMENT FUNDING
This invention was made with government support under Grant No. DC012593, awarded by the National Institutes of Health and under Grant No. 1445197 awarded by the National Science Foundation. The Government has certain rights in the invention.--

Signed and Sealed this
Fourth Day of February, 2025

Coke Morgan Stewart
*Acting Director of the United States Patent and Trademark Office*